United States Patent
Chen et al.

(10) Patent No.: US 8,514,888 B2
(45) Date of Patent: Aug. 20, 2013

(54) METHODS AND DEVICES FOR WIRELESS BROADCASTING SERVICE COMMUNICATION ENVIRONMENT

(75) Inventors: Ren-Jr Chen, Sanchong (TW); Yu-Chuan Fang, Yilan (TW)

(73) Assignee: Industrial Technology Research Institute, Chutung, Hsinchu (TW)

( * ) Notice: Subject to any disclaimer, the term of this patent is extended or adjusted under 35 U.S.C. 154(b) by 844 days.

(21) Appl. No.: 12/557,082

(22) Filed: Sep. 10, 2009

(65) Prior Publication Data
US 2010/0067425 A1 Mar. 18, 2010

Related U.S. Application Data

(60) Provisional application No. 61/096,752, filed on Sep. 12, 2008.

(51) Int. Cl.
*H04J 3/24* (2006.01)

(52) U.S. Cl.
USPC .......................................... 370/474; 370/312

(58) Field of Classification Search
USPC ......... 370/312, 328, 335–336, 338, 342–343, 370/345, 432, 441–442, 465, 473–474, 476, 370/479–480
See application file for complete search history.

(56) References Cited

U.S. PATENT DOCUMENTS

| | | | | |
|---|---|---|---|---|
| 6,044,116 | A * | 3/2000 | Wang | 375/265 |
| 7,012,911 | B2 * | 3/2006 | Kasturi et al. | 370/342 |
| 7,103,020 | B2 * | 9/2006 | Eriksson et al. | 370/328 |
| 2004/0001555 | A1 * | 1/2004 | Taffin et al. | 375/261 |
| 2007/0174480 | A1 * | 7/2007 | Cheung et al. | 709/233 |
| 2007/0232366 | A1 * | 10/2007 | Chen et al. | 455/574 |
| 2007/0288834 | A1 * | 12/2007 | Crozier et al. | 714/790 |
| 2008/0232401 | A1 * | 9/2008 | Ahmadi et al. | 370/469 |
| 2008/0320353 | A1 * | 12/2008 | Blankenship et al. | 714/746 |
| 2009/0041110 | A1 * | 2/2009 | Malladi | 375/240 |
| 2009/0147720 | A1 * | 6/2009 | Wang et al. | 370/312 |
| 2009/0252070 | A1 * | 10/2009 | Connors et al. | 370/311 |
| 2009/0296624 | A1 * | 12/2009 | Ryu et al. | 370/312 |
| 2010/0278093 | A1 * | 11/2010 | Wang et al. | 370/312 |
| 2012/0051339 | A1 * | 3/2012 | Chamberlain et al. | 370/337 |

* cited by examiner

*Primary Examiner* — Kevin Mew
(74) *Attorney, Agent, or Firm* — Finnegan, Henderson, Farabow, Garrett & Dunner, LLP

(57) ABSTRACT

A method for subblock generation in a wireless communication system includes receiving, by a subblock generator, one or more data blocks, and selecting, based on one or more criteria, one or more functional blocks and an operational order of the one or more functional blocks. The method also includes processing the received one or more data blocks using the selected one or more functional blocks in the selected operational order to generate a plurality of data subblocks, and transmitting the plurality of data subblocks to the plurality of receiving devices. The method further includes transmitting, to the plurality of receiving devices, location information for each of the plurality of data subblocks.

20 Claims, 8 Drawing Sheets

FIG. 1 —PRIOR ART—

METHODS AND DEVICES FOR WIRELESS BROADCASTING SERVICE COMMUNICATION ENVIRONMENT

PRIORITY

This application claims the benefit of priority of U.S. Provisional Application No. 61/096,752, filed Sep. 12, 2008, which is incorporated by reference herein in its entirety for any purpose.

TECHNICAL FIELD

The present disclosure relates generally to methods and devices for communication systems and, more particularly, to methods and devices for wireless communication systems.

BACKGROUND

Wireless communication systems allow wireless devices to communicate without the necessity of wired connections. Because wireless systems have become so integrated into daily life, there is a growing demand for wireless communication systems that support multimedia services such as speech, audio, video, file and web downloading, and the like. Various wireless communication protocols and transmission control mechanisms have been developed to meet the growing demands of multimedia services over wireless communication networks and to improve the performance of these multimedia services. An exemplary transmission control mechanism for transmitting packet data units (PDUs) in wireless systems is Hybrid Automatic Repeat Request (HARQ).

Generally, there are two main variants of HARQ retransmission mechanisms supported in a wireless system employing W-CDMA: incremental redundancy (IR) and chase combining. Using IR, a physical (PHY) layer will encode the HARQ packet thereby generating several versions of encoded subpackets, called Redundancy Versions (RVs). In IR, the encoding process may include the steps of encoding, interleaving, and puncturing, and multiple RVs may be created when the HARQ packet passes through these steps. For chase combining, the PHY layer also encodes the HARQ packet. However, only one version of the encoded packet is generated. Thus, in chase combining, the transmitting device retransmits the same encoded version every time retransmission is required.

FIG. 1 is a diagram illustrating point-to-multipoint (PTM) transmissions of HARQ PDUs (i.e., a single transmitting device transmits to multiple receiving devices). In PTM transmission, a transmitting device 110 transmits encoded PDUs, also called redundancy versions, using a common radio resource, and instructs a group of receiving devices 120, e.g., receiving devices 120a, 120b, and 120c, to receive the transmitted encoded PDUs simultaneously with one another. PTM transmissions may be used by transmitting device 110 for broadcasting and/or multicasting of packet data.

Generally, one impact to channel quality is the distance between the transmitting device and the receiving device. Therefore, transmitting device 110 may evaluate channel conditions between itself and each of receiving devices 120 and, based on the evaluated channel quality information, determine a desired number of encoded PDUs needed for every receiving device 120 in the group of receiving devices 120 within its broadcast range to successfully receive the encoded data. Thus, when performing PTM transmissions, transmitting device 110 may cause every receiving device 120 to receive the same number of encoded PDUs. Specifically, in order to provide every receiving device 120 with an opportunity to correctly receive and decode the packet data, transmitting device 110 may send a greater number of encoded PDUs in order to enable the successful reception of the packet data by every member of the group of receiving devices 120.

For example, referring to FIG. 1, although receiving devices 120a and 120b may be capable of receiving fewer encoded PDUs to successfully decode the data (e.g., receiving device 120a may require only one encoded PDU $a_0$, and receiving device 120b may require two encoded PDUs $a_0$ and $a_1$), receiving device 120c may have poorer channel quality and thus may require a greater number of encoded PDUs (e.g., receiving device 120c may require encoded PDUs $a_0$ through $a_{N-1}$). However, to ensure that all receiving devices 120 are able to receive and decode PTM transmissions, transmitting device 110 may be required to encode and modulate PTM transmissions to generate a larger number of encoded PDUs, e.g., $a_0$, through $a_{N-1}$, and receiving devices 120 may be required to receive and decode that larger number of encoded PDUs, which may greater than needed to successfully decode the PTM data. As a result, receiving devices 120 having good channel conditions may use unnecessary battery power to receive and decode the PTM data.

Because transmitting device 110 may not prepare a set of subpackets that are most appropriate to all the receiving devices 120 it serves, there may be significant delays and wasted resources for both the transmitting device 110 and any receiving devices 120. Furthermore, because transmitting device 110 may use a greater number of packets, or less efficiently modulated and coded subpackets, than are necessary for some or many of the receiving devices 120 in its range, receiving devices 120 that could successfully receive data transmitted using fewer coded subpackets may unnecessarily spend resources receiving and decoding a greater amount of data.

The disclosed embodiments are directed to overcoming one or more of the problems set forth above.

SUMMARY

In one exemplary embodiment, the present disclosure is directed to a method for subblock generation in a wireless communication system including a plurality of receiving devices, comprising: receiving, by a subblock generator, one or more data blocks; selecting, based on one or more criteria, one or more functional blocks and an operational order of the one or more functional blocks; processing the received one or more data blocks using the selected one or more functional blocks in the selected operational order to generate a plurality of data subblocks; and transmitting the plurality of data subblocks to the plurality of receiving devices.

In another exemplary embodiment, the present disclosure is directed to an apparatus for point-to-multipoint (PTM) transmission in a wireless communication system, comprising: at least one memory to store data and instructions; and at least one processor configured to access the at least one memory and, when executing the instructions, to: receive, by a subblock generator, one or more data blocks; select, based on one or more criteria, one or more functional blocks and an operational order of the one or more functional blocks; process the received one or more data blocks using the selected one or more functional blocks in the selected operational order to generate a plurality of data subblocks; and transmit the plurality of data subblocks to the plurality of receiving devices.

In another exemplary embodiment, the present disclosure is directed to an apparatus for performing subblock generation, wherein the apparatus comprises: a repetition block configured to repeat one or more bits of a received bit sequence; a puncture block configured to remove one or more bits of the received bit sequence; and a bit selection block configured to receive a bit stream output by at least one of the repetition block and the puncture block, and select bits from the received bit stream based upon a selection pattern; wherein an operational order of the repetition block, the puncture block, and the bit selection block is determined based on one or more criteria.

DETAILED DESCRIPTION

Figure 1:
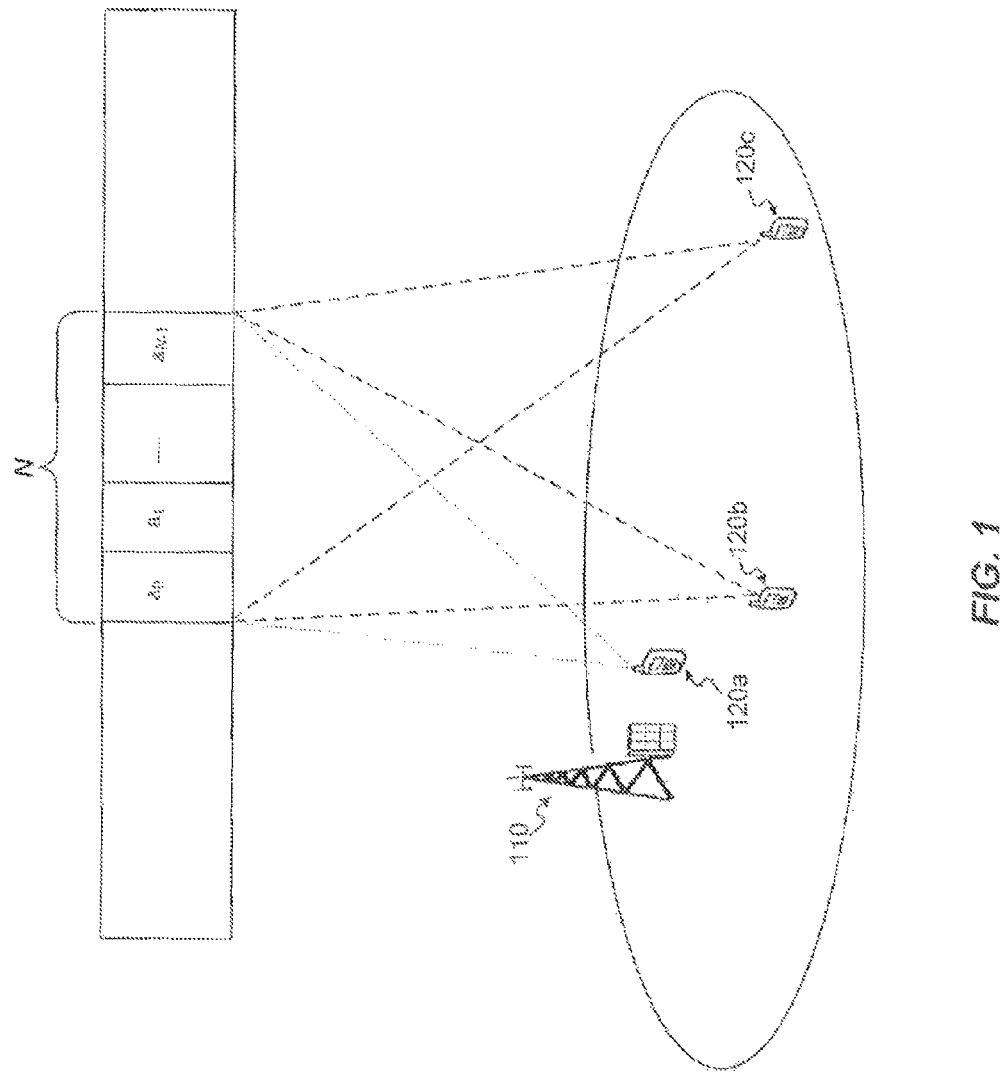
FIG. 1 is a diagram illustrating point-to-multipoint (PTM) communication in an exemplary wireless communication system.
Figure 2:
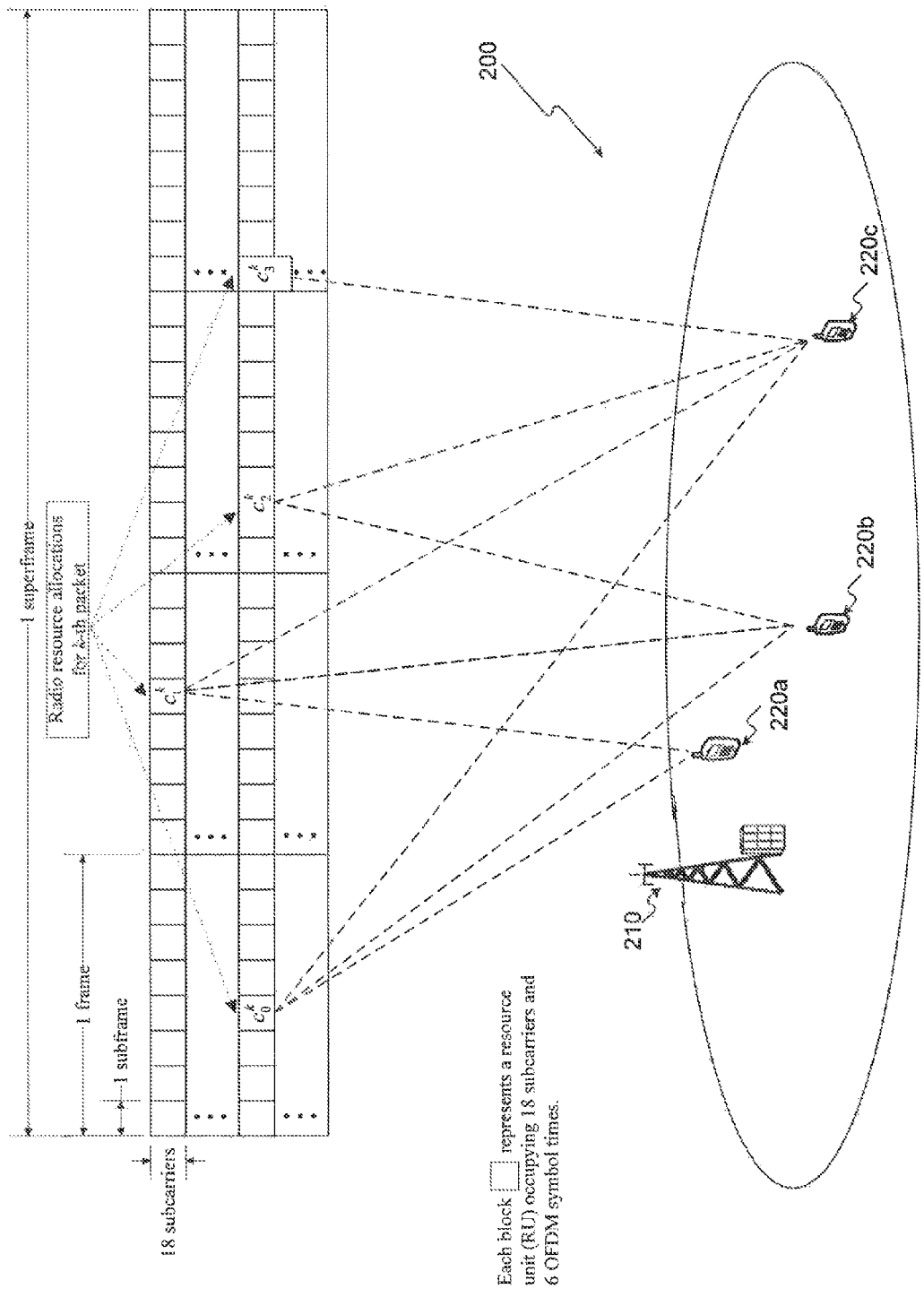
FIG. 2 is a diagram illustrating point-to-multipoint (PTM) communication in an exemplary wireless communication system, consistent with certain disclosed embodiments.

FIG. 2 is a diagram of an exemplary wireless communication system 200. The exemplary wireless communication system 200 of FIG. 2 may be based, for example, on the Institute of Electrical and Electronics Engineers (IEEE) 802.16 family of standards. More specifically, FIG. 2 shows the basic frame structure of IEEE 802.16m. In the basic frame structure shown in FIG. 2, a superframe consists of four frames, where each frame is divided into M=8 subframes, and each subframe has L=6 Orthogonal Frequency-Division Multiple Access (OFDMA) symbols. According to the IEEE 802.16m standard, a physical resource block is defined as consecutive L symbols in the time domain and K=18 consecutive subcarriers in the frequency domain. Thus, there are N resource blocks in a subframe, the number N depending on the system bandwidth.

As shown in FIG. 2, wireless communication system 200 may include one or more transmitting devices (TD) 210, e.g., TD 210, and one or more subscriber stations (SS) 220, e.g., SS 220a, SS 220b, and SS 220c.

TD 210 may be any type of communication device configured to transmit and/or receive data and/or communications to and from one or more SSs 220 in wireless communication system 200, many of which are known in the art. In some embodiments, TD 210 may also be referred to as, for example, a Node-B, a base transceiver system (BTS), an access point, etc. In other embodiments, TD 210 may be a relay station, an intermediate node, or an intermediary. In one exemplary embodiment, TD 210 may have a broadcast/reception range within which TD 210 may wirelessly communicate with one or more one or more SSs 220. Broadcast ranges may vary due to power levels, location, and interference (physical, electrical, etc.).

Figure 3A:
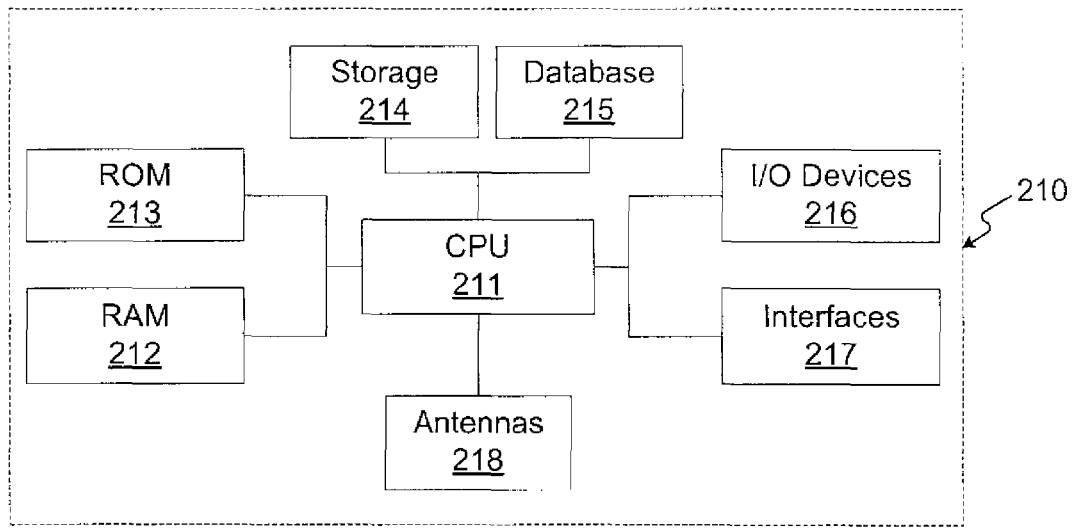
FIG. 3a is a diagram of an exemplary transmitting device (TD), consistent with certain disclosed embodiments.

FIG. 3a is a diagram of an exemplary TD 210, consistent with certain disclosed embodiments. As shown in FIG. 3a, each TD 210 may include one or more of the following components: at least one central processing unit (CPU) 211 configured to execute computer program instructions to perform various processes and methods, random access memory (RAM) 212 and read only memory (ROM) 213 configured to access and store information and computer program instructions, memory 214 to store data and information, databases 215 to store tables, lists, or other data structures, I/O devices 216, interfaces 217, antennas 218, etc. Each of these components is well-known in the art and will not be discussed further.

Although not shown, TD 210 may include one or more mechanisms and/or devices by which TD 210 may perform the methods described herein. For example, TD 210 may include one or more encoders, one or more interleavers, one or more circular buffers, one or more multiplexers, one or more permuters, one or more arithmetic logic units and/or their constituent parts, etc. These mechanisms and/or devices may include any combination of hardware and/or software components and may be included, in whole or in part, in any of the components shown in FIG. 3a.

SS 220 may be any type of computing device configured to wirelessly transmit and/or receive data to and from TD 210 in wireless communication system 200. SS 220 may include, for example, servers, clients, desktop computers, laptop computers, network computers, workstations, personal digital assistants (PDA), tablet PCs, scanners, telephony devices, pagers, cameras, musical devices, etc. In addition, SS 220 may include one or more wireless sensors in a wireless sensor network configured to communicate by means of centralized and/or distributed communication. In one exemplary embodiment, SS 220 may be a mobile computing device. In another exemplary embodiment, SS 220 may be a fixed computing device operating in a mobile environment, such as, for example, a bus, a train, an airplane, a boat, a car, etc.

Figure 3B:
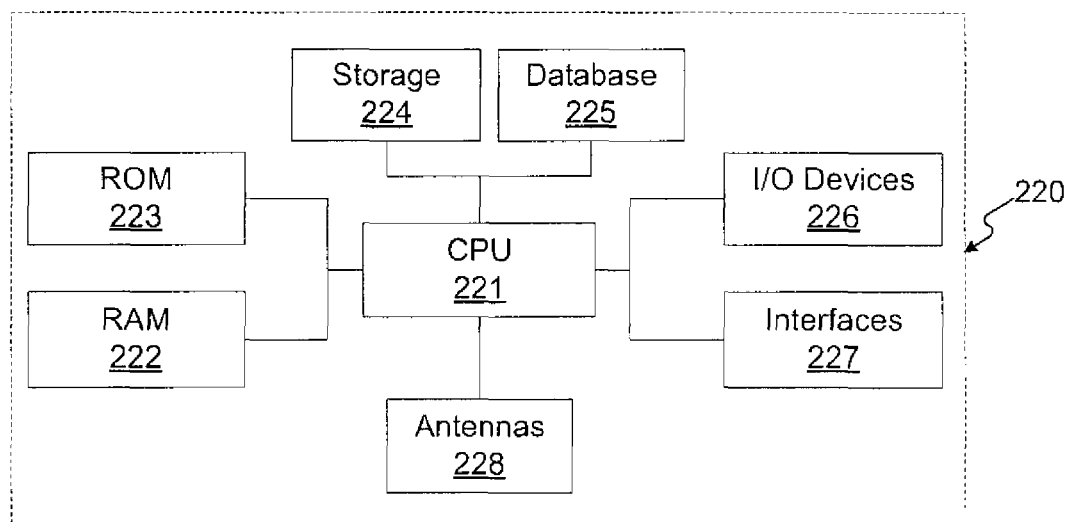
FIG. 3b is a diagram of an exemplary subscriber station (SS), consistent with certain disclosed embodiments.

FIG. 3b is a diagram of an exemplary SS 220, consistent with certain disclosed embodiments. As shown in FIG. 3b, each SS 220 may include one or more of the following components: at least one central processing unit (CPU) 221 configured to execute computer program instructions to perform various processes and methods, random access memory (RAM) 222 and read only memory (ROM) 223 configured to access and store information and computer program instructions, memory 224 to store data and information, databases 225 to store tables, lists, or other data structures, I/O devices 226, interfaces 227, antennas 228, etc. Each of these components is well-known in the art and will not be discussed further.

Although not shown, SS 220 may include one or more mechanisms and/or devices by which SS 220 may perform the methods as described herein. For example, SS 220 may include one or more encoders, one or more interleavers, one or more circular buffers, one or more multiplexers, one or more permuters, one or more arithmetic logic units and/or their constituent parts, etc. These mechanisms and/or devices may include any combination of hardware and/or software components and may be included, in whole or in part, in any of the components shown in FIG. 3b.

In exemplary wireless communication system 200 of FIG. 2, transmissions between TD 210 and SSs 220 may be divided into variable length sub-frames: uplink (UL) sub-frames and downlink (DL) sub-frames. Generally, the UL sub-frames may include ranging channels, a channel quality information channel (CQICH), and UL data bursts containing data.

The DL sub-frames may include a preamble, a Frame Control Header (FCH), a DL-MAP, a UL-MAP, a Multicast and Broadcast (MBS)-MAP, and a DL data burst area. The preamble may be used to provide a reference for synchronization. For example, the preamble may be used to adjust a timing offset, a frequency offset, and power. The FCH may contain frame control information for each connection including, for example, decode information for the receiving device.

The DL-MAP and UL-MAP may be used to allocate channel access for both uplink and downlink communication. That is, the DL-MAP may provide a directory of access slot locations within the current downlink sub-frame, and the UL-MAP may provide a directory of access slot locations within the current uplink sub-frame. The MBS-MAP may be used to provide a directory of access slot locations for point-to-multipoint (PTM) data bursts. In the DL-MAP and/or MBS-MAP, the directories may take the form of one or more MAP Information Elements (MAP IEs). Each MAP IE in the DL-MAP or MBS-MAP may contain parameters to identify where a data burst may be located, the length of the data burst, the identity of the intended recipient of the data burst, and one or more transmission parameters.

For example, each MAP IE in the DL-MAP and/or MBS-MAP may contain a Connection ID (CID), identifying the destination device for which a data burst is intended, a Downlink Interval Usage Code (DIUC), representing a downlink interval usage code by which downlink transmission is defined, an OFDMA Symbol Offset, indicating the offset of the OFDMA symbol in which a data burst starts, a sub-channel offset, indicating the lowest-index OFDMA sub-channel for carrying the burst, etc. Other parameters may also be included in the MAP IE such as, for example, a boosting parameter, a parameter indicating a number of sub-channels, a parameter indicating a number of OFDMA symbols, etc. An OFDMA symbol may be the number of carriers equal to the size of a Fourier transform, and may be constructed from data carriers, pilot carriers, null carriers, etc.

The DL-MAP and UL-MAP may each be followed by the data burst area. The data burst area may include one or more data bursts. Each data burst in the data burst area may be modulated and encoded according to the control type of a corresponding connection-switched control data. Generally, the DL-MAP, the UL-MAP, and the MBS-MAP may be referred to as packet data units (PDUs) or simply packet data. PDUs may be used to transmit data point-to-point (PTP) and/or point-to-multipoint (PTM).

Figure 4:
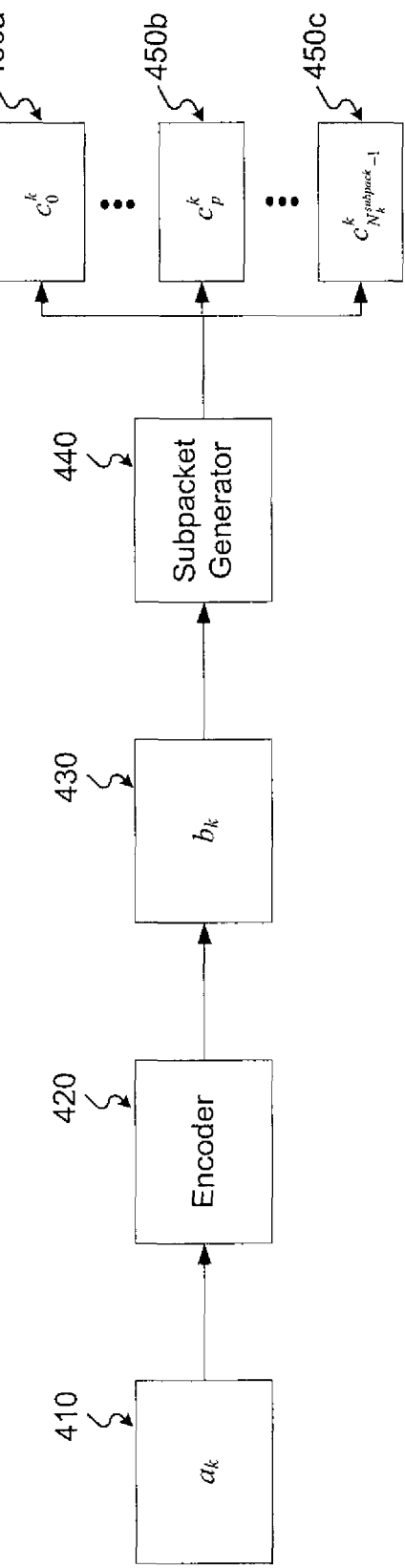
FIG. 4 is a diagram illustrating an exemplary subblock generation process, consistent with certain disclosed embodiments.

FIG. 4 is a block diagram illustrating subpacket or sub-block generation process in a wireless communication system, such as, for example, wireless communication system 200 of FIG. 2. As shown in FIGS. 2 and 4, TD 210 may transmit $N_{pack}$ packets or blocks to multiple receiving devices 220. The kth packet or block may have $L_k^{data}$ bits, where k=0, 1, ..., $N_{pack}-1$. This is shown in packet or block $a_k$ 410, where $$a_k = [a_{0,k}, a_{1,k}, \ldots, a_{l,k}, \ldots, a_{L_k^{data}-1,k}], l=0, \ldots, L_k^{data}-1.$$

The kth packet or block, e.g., $a_k$, will be sent to encoder 420 to be encoded by a desired coding scheme. The output of the encoder 420 is shown as packet or block $b_k$ 430, where $$b_k = [b_{0,k}, b_{1,k}, \ldots, b_{l,k}, \ldots, b_{L_k^{coded}-1,k}], l=0, \ldots, L_k^{coded}-1, \text{ where length is } L_k^{coded}.$$

The encoded kth packet or block, e.g., $b_k$, will be sent to subpacket generator 440 to generate subpackets, which may also be referred to as subblocks, with $N_k^{subpack}$ versions to be transmitted. The output of subpacket generator 440, the pth subpacket of the kth packet or block, is illustrated by subblocks $c_p^k$ 450, including subblock $c_0^k$ 450a, subblock $c_p^k$ 450b, and subblock $c_{N_k^{subpack}-1}^k$ 450c, where $$c_p^k = [c_{0,p}^k, c_{1,p}^k, \ldots, c_{L_{p,k}^{subpack}-1,p}^k], \text{ for } i=0,1, \ldots L_{p,k}^{subpack}-1, \text{ and } p=0,1, \ldots, N_k^{subpack}-1$$

where $L_{p,k}^{subpack}$ is the total number of bits in the pth subpacket (or subblock) of the kth packet or block.

Referring to FIG. 2, TD 210 may encode and modulate PTM information bits to achieve a set of coded subpackets, e.g., $c_0^k$, $c_1^k$, $c_2^k$ and $c_3^k$, and transmit the set of coded subpackets to one or more receiving devices (e.g., SS 220a, SS 220b, and SS 220c).

Specifically, in FIG. 2, TD 210 may allocate four radio resources for the coded packets $b_k$. Each radio resource may have different transmission techniques, e.g., different modulation, different number of antennas, etc. Based on each radio resource capability (e.g., bits), the four subpackets (or subblocks), e.g., $c_0^k$, $c_1^k$, $c_2^k$, and $c_3^k$, are generated from $b_k$. Due to channel or link conditions between antennas of a sending device and a receiving device, however, it may not be possible for each of the four subpackets (or subblocks) to be decoded.

Receiving devices SS 220a, SS 220b, and SS 220c may each receive the number of coded subpackets required to successfully decode the PTM transmission. For example, receiving devices SS 220 may each determine the number of coded subpackets to retrieve based on one or more transmission and channel conditions reported from one or more receiving devices SS 220 (e.g., SS 220a, SS 220b, or SS 220c). Thus, as shown in FIG. 2, receiving device SS 220a may determine to receive two coded subpackets, e.g., $c_0^k$ and $c_1^k$, because its link conditions are good, receiving device SS 220b may determine to receive three coded subpackets, e.g., $c_0^k$, $c_1^k$, and $c_2^k$, because its links conditions are not as good as those of receiving device SS 220a, and receiving device SS 220c may determine to receive four coded subpackets, e.g., $c_0^k$, $c_1^k$, $c_2^k$, and $c_3^k$, because its link conditions are poor.

Figure 5:
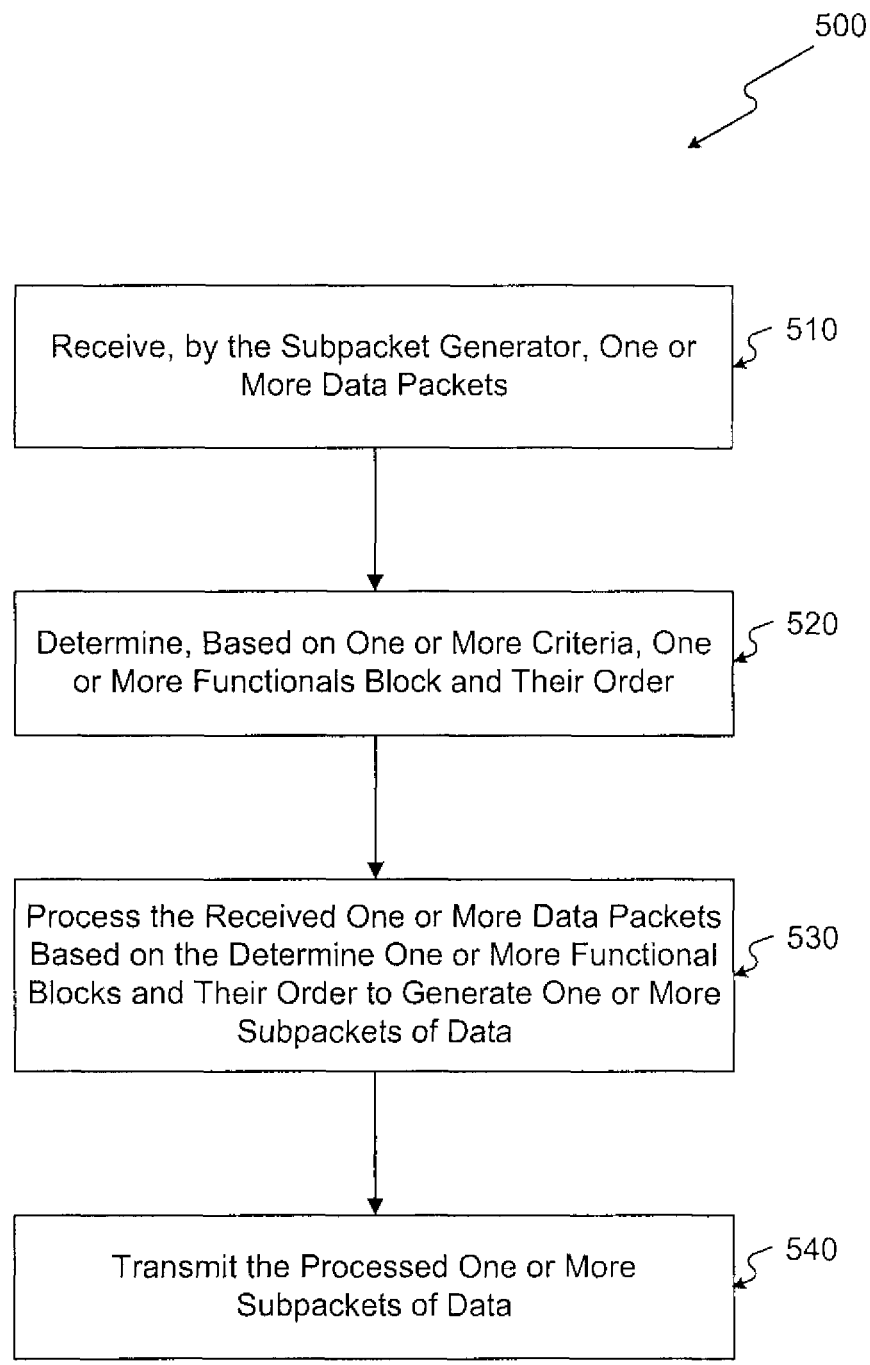
FIG. 5 is a flowchart illustrating an exemplary subblock generation process, consistent with certain disclosed embodiments.

FIG. 5 is a flow chart illustrating the method 500 of subpacket generation and transmission by subpacket generator 440 in wireless transmission system 200, consistent with certain disclosed embodiments. As discussed above in connection with FIG. 4, subpacket generator 440 may receive one or more data packets $b_k$ (510). Based on one or more criteria, one or more functional blocks of the subpacket generator 440 may be selected and their operational order determined (520). The one or more criteria may include, for example, transmission and channel conditions, such as measured signal strength, channel quality indicator (CQI), signal to interference plus noise ratio (SINR), bit error rate (BER), block error rate (BLER), packet error rate, etc. Other examples of the one or more criteria may include data properties, forward error correction (FEC) scheme, etc.

Once the one or more functional blocks of the subpacket generator 440 have been selected and their order of operation determined, the received one or more data packets $b_4$ may be processed (530) to generate one or more data subpackets, e.g., $c_0^k$, $c_1^k$, $c_2^k$, and $c_3^k$. These one or more data subpackets may also be referred to as data versions. The one or more data subpackets may then be transmitted by TD 210 to one or more SSs 210 (540). To achieve diversity gain, the one or more data subpackets may be transmitted at different times, frequencies, antennas, and/or constellation indices.

As discussed above in connection with FIG. 2, the data versions may be transmitted in one or more subframes in a radio resource. In addition, TD 210 may provide information for each of the one or more SSs 220 to locate and retrieve the transmitted set of data subpackets within one or more subframes. The location information may, for example, be found in a MAC header. In some embodiments, the location information may be provided in one or more MAP IEs (e.g., DL-MAP IEs, MBS-MAP IEs, etc.). In other embodiments, the location information may be provided in multicast control channels. The location information may be in the same PDU that contains one or more data subpackets of the set of data subpackets or in any previously transmitted PDU.

As also discussed above in connection with FIG. 2, SSs 210 may, in turn, determine a number of data subpackets, or data versions, to be received based on their individual conditions, such as, for example, link quality condition, user mobility speed condition, QoS condition, buffer condition, etc.

Figure 6:
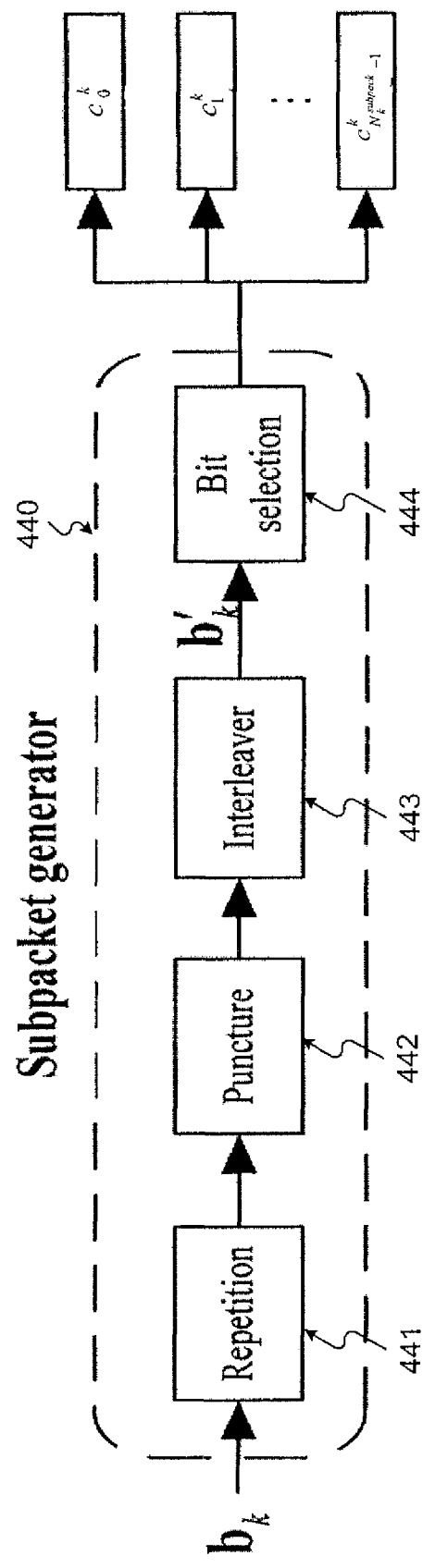
FIG. 6 is a diagram illustrating an exemplary subpacket generator, consistent with certain disclosed embodiments.

FIG. 6 is a diagram illustrating an exemplary subpacket generator 440 for generating one or more data subpackets, e.g., $c_0^k$, $c_1^k$, $c_2^k$, and $c_3^k$, consistent with certain disclosed embodiments. As shown in FIG. 6, subpacket generator 440 may be configured to receive one or more encoded packets $b_k$. Subpacket generator 440 may include a number of functional blocks, such as, for example, a repetition block 441, a puncture block 442, an interleaver block 443, and a bit selection block 444, and subblock generator 440 may utilize one or more of these functional blocks in any desired order. The desired order may be determined based on the type of subpacket received and/or the desired output. As shown in FIG. 6, the determined order of functional blocks in subblock generator 440 is repetition block 441, puncture block 442, interleaver block 443, and bit selection block 444.

Repetition block 441 may be configured to repeat certain bits and would, therefore, increase the length of a bit sequence. Puncture block 442 may be configured to remove (or puncture) some bits of a sequence, thereby reducing the length of the sequence. The repetition block 441 and puncture block 442 may assist in choosing desired bits for inclusion in the subpacket (or subblock) adaptively. For example, the repetition block 441 may be configured to repeat the more significant bits, while the puncture block 442 may be configured to remove the less significant bits. Bit selection block 444 may be configured to select bits from its input $b'_k$ by a selection pattern. In some embodiments, bits may be considered more significant bits if, for example, the bits are systematic or parity bits, the bits had ever been transmitted or retransmitted, or if the bits provide assistance in decoding the codeword.

As used herein, interleaver block 443 may be configured to permute the inputted bit sequence. Interleaver block 443 may also be configured to make more significant bits have priority in transmission. In some embodiments, interleaver block 443 may be configured to provide more protection to the more significant bits. In addition, interleaver block 443 may be configured to allow retransmitted bits to have different levels of protection than bits sent in previous transmissions.

The different levels of protection may be caused by the positions of the bits on a constellation. For example, referring to a constellation of 16 Quadrature Amplitude Modulation (QAM) specified in IEEE 802.16e, the first bit ($b_3$), which called the most significant bit (MSB), and third bit ($b_1$), respectively, characterize the sign of the real part and image part. In the constellation, the first bit is a "1" in the left half and a "0" in the right half, and the third bit is a "0" in the top half and a "1" in the bottom half. During symbol transmission, errors may occur in demodulation regions in the same half or same quadrant. As such, the error probability of half- or quadrant-determining bits may be relatively high in comparison to bits that do not define a half or a quadrant. Thus, the half- or quadrant-determining bits may have a higher signal priority and may be more reliable in transmission. Therefore, in some embodiments, more significant coded bits (i.e., systematic bits) may be allocated to the sign bits of a complex-valued modulation symbol for greater reliability. In some embodiments, if the bits are retransmitted bits, they may be mapped to different positions on the constellation in order to achieve greater constellation diversity.

In some embodiments, the different levels of protection may be caused by channel conditions associated with one or more antennas. For example, good channel conditions may provide more reliable protection for bits. Therefore, the more significant bits may be assigned to the bit streams having better channel conditions to achieve better protection of the bits. If the bits are retransmitted bits (i.e., the bits have been transmitted previously), they may be assigned to different bit streams passing different channel conditions in order to achieve antenna or spatial diversity.

In addition to interleaver block 443, the initial index setting of bit selection block 444 may cause more significant bits to have priority in transmission, and/or provide more protection to the more significant bits, and/or allow retransmitted bits to have different levels of protection than bits in previous transmissions. Through the use of these four function blocks (i.e., repetition block 441, puncture block 442, interleaver block 443, and bit selection block 444), it may be possible to obtain any desired subpackets (or versions).

The functionality of repetition block 441 may be illustrated using $\Pi(x)$, referred to below as the "repetition function," the functionality of puncture block 442 may be illustrated using $\tilde{x}$, referred to below as the "puncturing function," and the functionality of interleaver block 443 may be illustrated using $\Pi(x)$, referred to as the "interleaver function." Thus, $b'_k = [IL(\Pi(b_k))]$, where $b_k = [b_{0,k}, b_{1,k}, \ldots, b_{L_k^{coded}-1,k}]$, as discussed above in connection with FIG. 4.

In certain disclosed embodiments, the repetition function n $\Pi(x)$ may be used twice, for example, to repeat $b_k$ twice. In one exemplary embodiment, $b_k$ may be repeated twice, in whole, to achieve $b'_k = [b_{0,k}, b_{1,k}, \ldots, b_{L_k^{coded}-1,k}, b_{0,k}, \ldots, b_{L_k^{coded}-1,k}]$. In another exemplary embodiment, the elements of $b_k$ may be individually repeated twice to achieve $b'_k = [b_{0,k}, b_{0,k}, b_{1,k}, b_{1,k}, \ldots, b_{L_k^{coded}-1,k}, b_{L_k^{coded}-1,k}]$. In some embodiments, if the first ⅔ of the coded bits of $b_k$ are more significant than the latter ⅓ of the coded bits, the first ⅔ of the coded bits of $b_k$ may be transmitted twice, in some cases with a desired bit order. In other embodiments, $b'_k$ may be created by a process where $b_k$ is repeated twice, and the final ⅙ of the coded bits are punctured, with the following result:

$$b'_k = [b_{0,k}, b_{1,k}, \ldots, b_{L_k^{coded}-1,k}, b_{0,k}, b_{1,k}, \ldots, b_{(2L_k^{coded}/3)-1,k}].$$

In certain embodiments, bit selection may be done using a method of circular selection using, for example, a circular buffer. The circular buffer may be used to receive and store the input coded input bits $b'_k$, and then allow the coded input bits $b_k$ to be selected circularly to form subpackets by a given initial index. In some embodiments, the desired bit order and weighting are produced before by other functional blocks. In some embodiments, the bit selection may select bits by a certain rule, e.g., select bits in a random-like manner to resist the channel interference, select bits to let bits have different levels of protections in the following processing, etc. Because the bit selection can achieve the same purpose as the interleaver, in some embodiments, the bit selection block may be used without the interleaver.

Bits may be selected consecutively and circularly from $b'_k$. In one exemplary embodiment, an initial index $F_0$ of the circular buffer is set and then the bit selection block 444 chooses bits continuously to generate $N_k^{subpack}$ subpackets (or subblocks). The initial index $F_0$ may be set to zero or any other arbitrary number. Thus, for example, assuming that the circular buffer is represented as $b'_k=[b'_{0,k}, b'_{1,k}, \ldots, b'_{L_k^{amended}-1,k}]$, $F_p$ represents the initial index for the pth subpacket (or subblock) in the circular buffer, $L_k^{amended}$ denotes the length of $b'_k$, and $\pi(i)$ denotes the index or address of selected bits in the buffer storing $b'_k$. In this configuration, bit selection block 444 may be configured to perform the following:

$$\begin{aligned}
&\text{for } p = 0, 1, \ldots, N_k^{subpack} - 1\\
&\quad \text{for } i = 0, 1, \ldots, L_{p,k}^{subpack} - 1\\
&\quad\quad \pi(i) = (F_p + i) \bmod(L_k^{amended});\\
&\quad\quad c_{i,p}^k = b'_{\pi(i),k};\\
&\quad \text{end}\\
&\quad F_{p+1} = F_p + L_{p,k}^{subpack};\\
&\text{end}
\end{aligned}$$

In another exemplary embodiment, the initial index is renewed each round of bit selection according to each desired subpacket (or subblock). Thus, for example, again assuming that the circular buffer is represented as $b'_k=[b'_{0,k}, b'_{1,k}, \ldots, b'_{L_k^{amended}-1,k}]$, $F_p$ represents the initial index for the pth subpacket (or subblock) in the circular buffer, $L_k^{amended}$ denotes the length of $b'_k$, and $\pi(i)$ again denotes the index or address of selected bits in the buffer storing $b'_k$. In this configuration, bit selection block 444 may be configured to perform the following:

$$\begin{aligned}
&\text{for } p = 0, 1, \ldots, N_k^{subpack} - 1\\
&\quad \text{Set } F_p;\\
&\quad \text{for } i = 0, 1, \ldots, L_{p,k}^{subpack} - 1;\\
&\quad\quad \pi(i) = (F_p + i) \bmod(L_k^{amended});\\
&\quad\quad c_{i,p}^k = b'_{\pi(i),k};\\
&\quad \text{end}\\
&\text{end}
\end{aligned}$$

In this exemplary embodiment, the result may be equivalent to that of the first exemplary embodiment when the following is set:

$$F_p = \sum_{j=0}^{P} L_{j-1,k}^{subpack},$$

where $L_{-1,k}^{subpack}$ is set to zero or any other number as the initial index $F_0$. If there are other functional blocks besides bit selection block 444, e.g., repetition block 441, puncture block 442, or interleaver block 443, $b'_k$ may likely have been specified by one or more previously executed blocks because the circular selection is fixed as consecutively and circularly selecting.

In addition to information about where the transmitted subpacket data may be found in a radio resource, TD 210 may provide enough information about the functional blocks to the SSs 220 by using one or more control signals or through system specifications. For example, if an interleaver block 443 is used, SS 220 may require information regarding the interleaving table or pattern in order to successfully recover the bit sequence. Similarly, TD 210 should provide information to SSs 220 regarding repetition block 441 and puncturing block 442. In order to provide the information about interleaving and puncture to SSs 220, TD 210 may provide SSs 220 with information about $b_k$, e.g., the pattern which records how $b_k$ is transformed into $b'_k$. In addition, TD 210 should advise SSs 220 about the initial index $F_0$ used by bit selection block 444.

Figure 7:
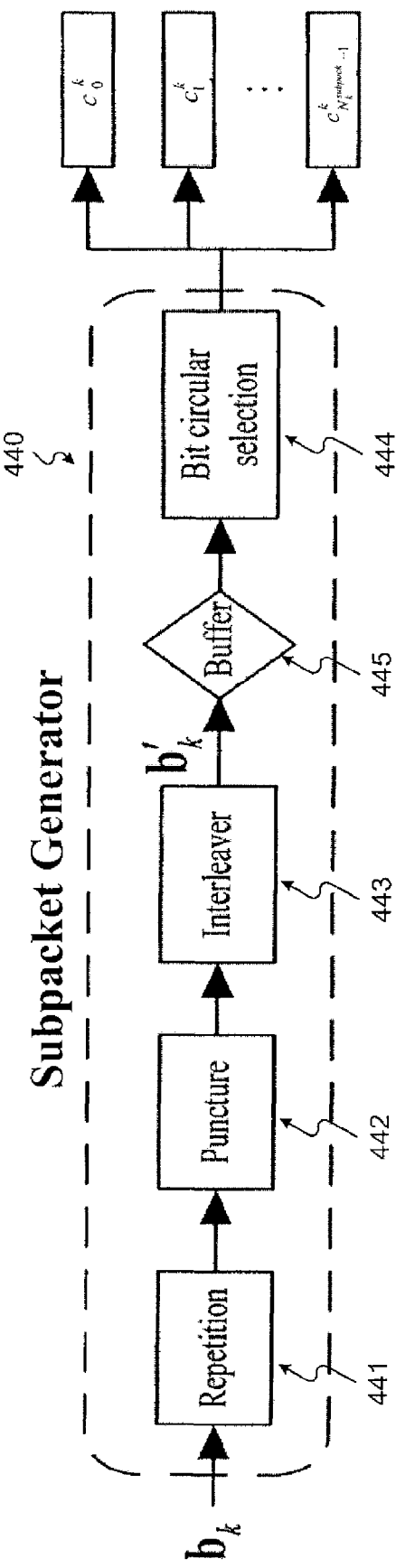
FIG. 7 is a diagram illustrating an exemplary subpacket generator, consistent with certain disclosed embodiments.

FIG. 7 is a diagram illustrating a second exemplary subpacket generator 440 for generating one or more data subpackets, e.g., $c_0^k$, $c_1^k$, $c_2^k$, and $c_3^k$, consistent with certain disclosed embodiments. Similarly to FIG. 6, subpacket generator 440 of FIG. 7 may also be configured to receive one or more encoded packets $b_k$. Subpacket generator 440 may include a number of functional blocks, such as, for example, repetition block 441, puncture block 442, interleaver block 443, bit selection block 444, and buffer 445, and subblock generator 440 may utilize one or more of these functional blocks in any desired order. The desired order may be determined based on the type of subpacket received and/or the desired output. As shown in FIG. 7, the determined order of functional blocks in subblock generator 440 is repetition block 441, puncture block 442, interleaver block 443, buffer 445, and bit selection block 444. In addition, FIG. 7 includes buffer 445 so that bit selection block 444 may configure access coded bits circularly from buffer 445.

Figure 8:
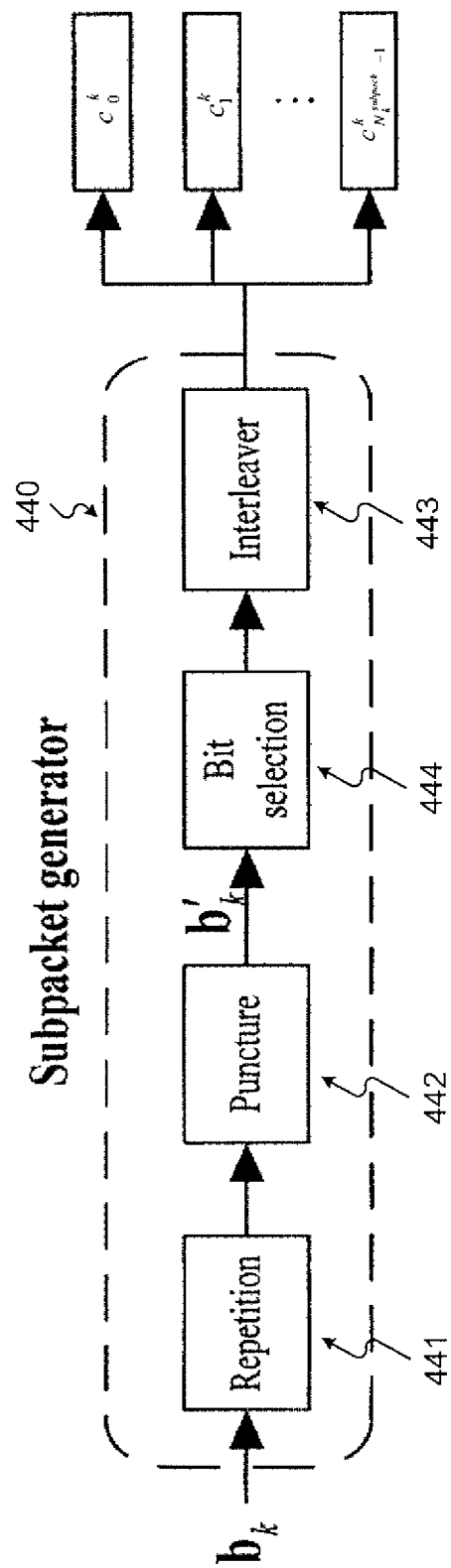
FIG. 8 is a diagram illustrating an exemplary subpacket generator, consistent with certain disclosed embodiments.

FIG. 8 is a diagram illustrating an third exemplary subpacket generator 440 for generating one or more data subpackets, e.g., $c_0^k$, $c_1^k$, $c_2^k$, and $c_3^A$, consistent with certain disclosed embodiments. Similarly to FIGS. 6 and 7, subpacket generator 440 of FIG. 7 may also be configured to receive one or more encoded packets $b_k$. Subpacket generator 440 may include a number of functional blocks, such as, for example, repetition block 441, puncture block 442, interleaver block 443, and bit selection block 444, and subblock generator 440 may utilize one or more of these functional blocks in any desired order. The desired order may be determined based on the type of subpacket received and/or the desired output. As shown in FIG. 8, the determined order of functional blocks in subblock generator 440 is repetition block 441, puncture block 442, bit selection block 444, and interleaver block 443. In FIG. 8, interleaver block 443 follows bit selection block 444. That is, subblock generator 440 may be configured to perform bit selection before interleaving. Thus, the pth quasi-subpacket may be permuted to form the pth subpacket $c_p^k$ for p=0, 1, ..., $N_k^{subpack}$. These $N_k^{subpack}$ subpackets (or subblocks) may pass through the same interleaving as individual packets. In some embodiments, the interleaving method for every subpacket in a packet may be different.

In this manner, the apparatuses and methods disclosed may be configured to adapt the bit order and weighting based on priority or one or more conditions to achieve any kind of diversity, including, for example, time diversity, frequency diversity, spatial diversity, and constellation diversity, which, in turn, may improve performance. Although the choices of functional blocks may, in some cases, be the same for different systems, it is possible to choose the most appropriate method to design subblock generator 440 to improve performance and reduce complexity in accordance with conditions of the system, such as, for example, coding scheme, modulator, channel interleaver, etc.

It will be apparent to those skilled in the art that various modifications and variations can be made in the system and method for reception in communication networks. It is intended that the disclosed standards and embodiments are to be considered as exemplary only, with a true scope of the invention being indicated by the following claims and their equivalents.

What is claimed is:

1. A method for subblock generation in a wireless communication system including a plurality of receiving devices, comprising:
   receiving, by a subblock generator, one or more data blocks;
   selecting, based on at least one of transmission or channel quality conditions, two or more functional blocks and an operational order of the two or more functional blocks, the two or more functional blocks including at least two of a repetition block, a puncture block, an interleave block, or a bit selection block, wherein a first functional block is different than a second functional block of the at least two blocks;
   processing the received one or more data blocks using the selected two or more functional blocks in the selected operational order to generate a plurality of data subblocks; and
   transmitting the plurality of data subblocks to the plurality of receiving devices.

2. The method of claim 1, further including;
   transmitting, to the plurality of receiving devices, location information for each of the plurality of data subblocks.

3. The method as in claim 1, further including:
   transmitting, to the plurality of receiving devices, information about the selected two or more functional blocks.

4. An apparatus for point-to-multipoint (PTM) transmission in a wireless communication system, the apparatus comprising:
   at least one memory to store data and instructions; and
   at least one processor configured to access the at least one memory and, when executing the instructions, to:
   receive, by a subblock generator, one or more data blocks;
   select, based on at least one of transmission or channel quality conditions, two or more functional blocks and an operational order of the two or more functional blocks, the two or more functional blocks including at least two of a repetition block, a puncture block, an interleave block, or a bit selection block, wherein a first functional block is different than a second functional block of the at least two blocks;
   process the received two or more data blocks using the selected two or more functional blocks in the selected operational order to generate a plurality of data subblocks; and
   transmit the plurality of data subblocks to the plurality of receiving devices.

5. The apparatus as in claim 4, wherein the at least one processor is further configured to:
   transmit, to the plurality of receiving devices, location information for each of the plurality of data subblocks.

6. The apparatus as in claim 4, wherein the at least one processor is further configured to:
   transmit, to the plurality of receiving devices, information about the selected two or more functional blocks.

7. An apparatus for performing subblock generation, wherein the apparatus comprises:
   at least one memory to store functional blocks;
   at least one processor configured to:
   access the at least one memory and execute:
      a repetition block repeating one or more bits of a received bit sequence;
      a puncture block removing one or more bits of the received bit sequence;
      a bit selection block receiving a bit stream output by at least one of the repetition block and the puncture block, and select bits from the received bit stream based upon a selection pattern; and
   determine an operational order of two or more of the repetition block, the puncture block, and the bit selection block based on at least one of transmission or channel quality conditions.

8. The apparatus as in claim 7, wherein, when the repetition block is configured to repeat one or more of the bits, the repetition block is configured to repeat one or more of the most significant bits.

9. The apparatus as in claim 7, wherein, when the puncture block is configured to repeat one or more of the bits, the puncture block is configured to remove one or more of the least significant bits.

10. The apparatus as in claim 7, wherein the bit selection block is further configured to:
    determine an initial index for bit selection, and
    perform bit selection based on the initial index.

11. The apparatus as in claim 7, wherein the at least one processor is further configured to access the at least one memory and execute:
    an interleaver causing more significant bits to have a greater priority in a transmission.

12. The apparatus as in claim 7, wherein the at least one processor is further configured to access the at least one memory and execute:
    an interleaver block providing protection for more significant bits.

13. The apparatus as in claim 12, wherein the protection to the more significant bits is based on positions of the more significant bits on a constellation.

14. The apparatus as in claim 12, wherein the protection to the more significant bits is based on channel conditions associated with one or more antennas.

15. The apparatus as in claim 7, wherein the at least one processor is further configured to access the at least one memory and execute:
    an interleaver block allowing retransmitted bits to have levels of protection that are different than levels of protection for bits in previous transmissions.

16. The apparatus as in claim 15, wherein the levels of protection associated with the retransmitted bits are based on positions of the retransmitted bits on a constellation.

17. The apparatus as in claim 15, wherein the levels of protection associated with the retransmitted bits are based on different channel conditions associated with one or more antennas.

18. The apparatus as in claim 7, further comprising:
    a buffer unit,
    wherein the at least one processor is further configured to access the at least one memory and execute:
       storing the received bit sequence in the buffer unit.

19. The apparatus as in claim 7, wherein the at least one processor is further configured to access the at least one memory and execute:
    the bit selection block further:
       determining an initial index for bit selection, and
       circularly selecting bits based on the initial index.

20. The apparatus as in claim 7, wherein the at least one processor is further configured to access the at least one memory and execute:
    the bit selection block
       determining an order of bit selection based on one or more criteria, and
       performing bit selection based on the selection rule.

* * * * *